(12) United States Patent
Wee

(10) Patent No.: US 11,008,013 B2
(45) Date of Patent: May 18, 2021

(54) VEHICLE AND METHOD OF CONTROLLING AN AIRBAG OF A VEHICLE

(71) Applicants: HYUNDAI MOTOR COMPANY, Seoul (KR); KIA MOTORS CORPORATION, Seoul (KR)

(72) Inventor: Sungdon Wee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 59 days.

(21) Appl. No.: 16/395,778

(22) Filed: Apr. 26, 2019

(65) Prior Publication Data
US 2020/0189604 A1    Jun. 18, 2020

(30) Foreign Application Priority Data

Dec. 18, 2018   (KR) .................. 10-2018-0164432

(51) Int. Cl.
| | |
|---|---|
| *B60W 40/09* | (2012.01) |
| *B60R 21/0132* | (2006.01) |
| *B60R 21/013* | (2006.01) |
| *B60R 21/01* | (2006.01) |

(52) U.S. Cl.
CPC ......... *B60W 40/09* (2013.01); *B60R 21/0132* (2013.01); *B60R 2021/01013* (2013.01); *B60R 2021/01231* (2013.01); *B60R 2021/01311* (2013.01); *B60R 2021/01313* (2013.01)

(58) Field of Classification Search
CPC .............. B60W 40/09; B60R 21/0132; B60R 2021/01313; B60R 2021/01231; B60R 2021/01311; B60R 2021/01013; B60R 21/0134
See application file for complete search history.

(56) References Cited

U.S. PATENT DOCUMENTS

| | | | | |
|---|---|---|---|---|
| 5,605,202 A * | 2/1997 | Dixon | ..................... | B60R 21/01 180/268 |
| 5,646,613 A * | 7/1997 | Cho | ........................ | B60R 19/38 340/903 |
| 7,380,821 B2 * | 6/2008 | Higuchi | ................. | B60N 2/427 280/743.1 |
| 2003/0227217 A1 * | 12/2003 | Yoshizawa | .......... | B60R 21/0132 303/193 |
| 2004/0006427 A1 * | 1/2004 | Stiller | ..................... | G06T 7/593 701/300 |
| 2004/0193347 A1 * | 9/2004 | Harumoto | .............. | G08G 1/167 701/45 |

(Continued)

*Primary Examiner* — Drew J Brown
(74) *Attorney, Agent, or Firm* — Lempia Summerfield Katz LLC

(57) ABSTRACT

A vehicle and a method of controlling an airbag of a vehicle enhances the efficiency in airbag deployment by predicting the possibility of collision of the vehicle in advance from a driving manipulation pattern of a driver and actively and variably adjusts a threshold value for deploying an airbag on the basis of a result of the prediction of the possibility of collision. The method of controlling an airbag of a vehicle includes determining a possibility of collision of the vehicle from a driving manipulation pattern of the vehicle, and variably adjusting a threshold value for deployment of the airbag on the basis of a result of the determination of the possibility of collision.

17 Claims, 8 Drawing Sheets

(56) References Cited

U.S. PATENT DOCUMENTS

| | | | | |
|---|---|---|---|---|
| 2004/0254729 A1* | 12/2004 | Browne | ............ | G01S 13/87 701/301 |
| 2006/0082110 A1* | 4/2006 | Gaboury | ............ | B60R 21/0134 280/735 |
| 2006/0106538 A1* | 5/2006 | Browne | ............ | B60R 21/01 701/301 |
| 2007/0018800 A1* | 1/2007 | Boss | ............ | B60Q 9/008 340/435 |
| 2009/0212993 A1* | 8/2009 | Tsunekawa | ............ | G01S 13/931 342/71 |
| 2011/0035116 A1* | 2/2011 | Ieda | ............ | G08G 1/166 701/45 |
| 2011/0125372 A1* | 5/2011 | Ito | ............ | G08G 1/166 701/45 |
| 2014/0163825 A1* | 6/2014 | Kim | ............ | B60R 21/0134 701/45 |
| 2020/0139963 A1* | 5/2020 | Kim | ............ | B60W 10/30 |

\* cited by examiner

VEHICLE AND METHOD OF CONTROLLING AN AIRBAG OF A VEHICLE

CROSS-REFERENCE TO RELATED APPLICATION

This application is based on and claims priority under 35 U.S.C. § 119 to Korean Patent Application No. 10-2018-0164432, filed on Dec. 18, 2018 in the Korean Intellectual Property Office, the disclosure of which is incorporated herein by reference.

BACKGROUND

1. Field

The present disclosure relates to a vehicle, and more specifically, to deployment of an airbag for protecting an occupant in a vehicle.

2. Description of the Related Art

An airbag is a device for protecting an occupant from an impact caused by a collision of a vehicle by a bag configured to inflate (deployment) in the surroundings, i.e., the passenger compartment, of the occupant quickly during the vehicle collision. The airbag is more effective when the occupant wears a seatbelt.

Deployment of the airbag is determined based on phenomena (a change in speed, an impact force, etc.) that occurs when the vehicle collides with an obstacle.

However, the airbag may not be deployed even in a situation where the airbag is supposed to be deployed, or the airbag may be deployed when the airbag is not supposed to be deployed.

SUMMARY

Therefore, it is an object of the present disclosure to provide a vehicle and a method of controlling an airbag of a vehicle, capable of enhancing the efficiency in airbag deployment. The efficiency in airbag deployment is enhanced by predicting the possibility of collision of the vehicle in advance, from a driving manipulation pattern of a driver, and actively and variably adjusting a threshold value for deploying an airbag on the basis of a result of the prediction of the possibility of collision.

Additional aspects of the disclosure are set forth in part in the description, which follows, and, in part, will be understood from the description, or may be learned by practice of the disclosed method of controlling an airbag and use in a vehicle.

Therefore, it is an aspect of the present disclosure to provide a method of controlling an airbag of a vehicle. The method of controlling the airbag includes determining a possibility of collision of the vehicle from a driving manipulation pattern of the vehicle and variably adjusting a threshold value for deployment of the airbag on the basis of a result of the determination of the possibility of collision.

The driving manipulation pattern of the vehicle may be a pattern of a driver manipulating the vehicle. A collision avoidance intent of the driver may be determined from the pattern of the driver manipulating the vehicle. The possibility of collision of the vehicle may be determined from a result of the determination of the collision avoidance intent.

The driving manipulation pattern of the vehicle may include a driving manipulation pattern for performing at least one of decelerating, braking, and steering of the vehicle.

The driving manipulation pattern for performing braking may include: at least one of a speed of the vehicle that is reduced by manipulation of a brake pedal; a pressure of a brake of the vehicle that is increased by manipulation of the brake pedal; and an anti-lock brake system (ABS) of the vehicle that is activated by manipulation of the brake pedal.

The driving manipulation pattern for performing decelerating may include at least one of a revolution per minute (rpm) of an engine of the vehicle that is reduced by manipulation of an accelerator pedal and an opening degree of a throttle valve of the engine of the vehicle that is reduced by manipulation of the accelerator pedal.

The driving manipulation pattern for performing steering may include at least one of a steering wheel of the vehicle that is manipulated, a heading direction of the vehicle that is changed by manipulation of the steering wheel, and a mismatch of a manipulation direction of the steering wheel and a direction of a route displayed on a map of a navigation system in the vehicle.

When a possibility of collision of the vehicle may be determined to be present, the threshold value for deployment of the airbag may be adjusted to be lowered such that a possibility of deployment of the airbag is increased.

The adjusting of the threshold value for deployment of the airbag may include a plurality of different threshold values.

It is another aspect of the present disclosure to provide a vehicle including: an airbag and an airbag driving unit configured to deploy the airbag. The vehicle further includes a controller configured to determine a possibility of collision of the vehicle from a driving manipulation pattern of the vehicle, and variably adjust a threshold value for deployment of the airbag on the basis of a result of the determination of the possibility of collision.

The driving manipulation pattern of the vehicle may be a pattern of a driver manipulating the vehicle. The controller may be configured to determine a collision avoidance intent of the driver from the pattern of the driver manipulating the vehicle. The controller may be further configured to determine the possibility of collision of the vehicle from a result of the determination of the collision avoidance intent.

The driving manipulation pattern of the vehicle may include a driving manipulation pattern for performing at least one of decelerating, braking, and steering of the vehicle.

The driving manipulation pattern for performing braking may include: at least one of a speed of the vehicle that is reduced by manipulation of a brake pedal; a pressure of a brake of the vehicle that is increased by manipulation of the brake pedal; and an anti-lock brake system (ABS) of the vehicle that is activated by manipulation of the brake pedal.

The driving manipulation pattern for performing decelerating may include at least one of a revolution per minute (rpm) of an engine of the vehicle that is reduced by manipulation of an accelerator pedal and an opening degree of a throttle valve of the engine of the vehicle that is reduced by manipulation of the accelerator pedal.

The driving manipulation pattern of the vehicle may include manipulating a steering wheel of the vehicle.

The driving manipulation pattern for performing steering may include at least one of a steering wheel of the vehicle that is manipulated, a heading direction of the vehicle that is changed by manipulation of the steering wheel, and a mismatch of a manipulation direction of the steering wheel and a direction of a route displayed on a map of a navigation system in the vehicle.

The adjusting of the threshold value for deployment of the airbag may include a plurality of different threshold values.

It is another aspect of the present disclosure to provide a method of controlling an airbag of a vehicle. The method for controlling the airbag includes determining a collision avoidance intent of a driver from a driving manipulation pattern of the vehicle. The method for controlling the airbag further includes determining a possibility of collision of the vehicle from a result of the determination of the collision avoidance intent of the driver. The method for controlling the airbag also includes variably adjusting a threshold value for deployment of the airbag on the basis of a result of the determination of the possibility of collision. In response to a possibility of collision that is determined to be present, the threshold value for deployment of the airbag is adjusted to be lowered such that a possibility of deployment of the airbag is increased.

The driving manipulation pattern of the vehicle may include a driving manipulation pattern for performing at least one of decelerating, braking, and steering of the vehicle.

It is another aspect of the present disclosure to provide a vehicle including: an airbag and an airbag driving unit configured to deploy the airbag. The vehicle further includes a controller configured to determine a collision avoidance intent of a driver from a driving manipulation pattern of the vehicle, determine a possibility of collision of the vehicle from a result of the determination of the collision avoidance intent of the driver, and variably adjust a threshold value for deployment of the airbag on the basis of a result of the determination of the possibility of collision. In response to a possibility of collision determined to be present, the threshold value for deployment of the airbag is adjusted to be lowered such that a possibility of deployment of the airbag is increased.

The driving manipulation pattern of the vehicle may include a driving manipulation pattern for performing at least one of decelerating, braking, and steering of the vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
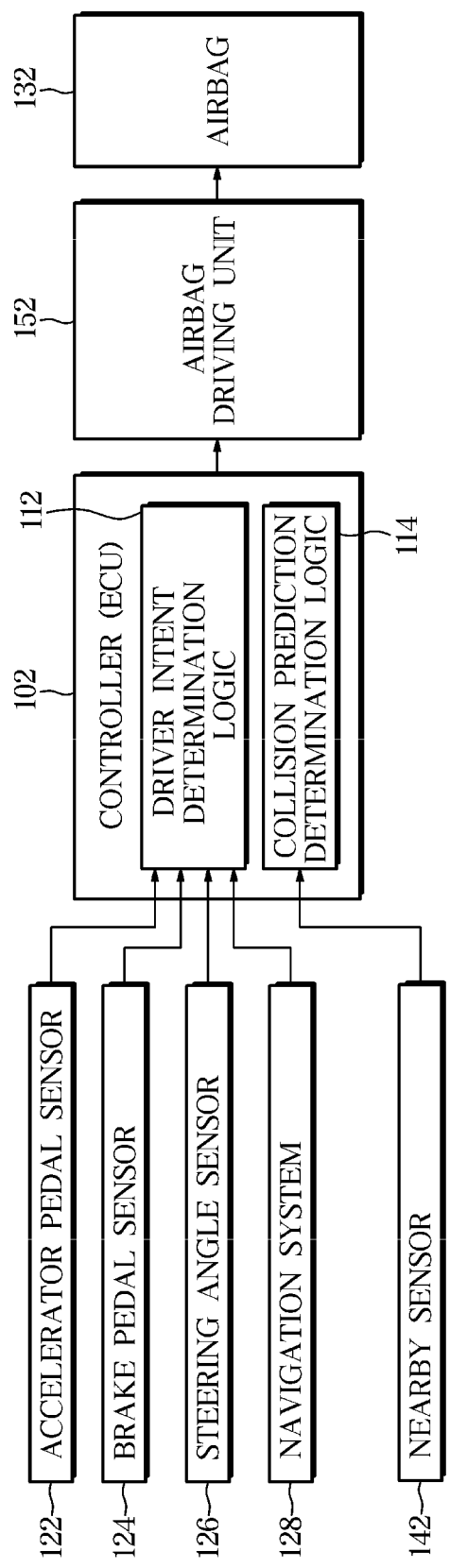
FIG. 1 is a view illustrating an airbag control system of a vehicle according to an embodiment of the present disclosure.

FIG. 1 is a view illustrating an airbag control system of a vehicle according to an embodiment of the present disclosure.

Referring to FIG. 1, a controller 102, i.e., an electronic control unit (ECU) is provided to control an airbag deployment operation as a whole. The controller 102 includes a driver intent determination logic 112 and a collision prediction determination logic 114. The controller 102 actively and variably adjusts a threshold value for deploying an airbag 132 and transmits the adjusted threshold value to an airbag driving unit 152. The controller 102 refers to at least one of the driver intent determination logic 112 and the collision prediction determination logic 114 to actively and variably adjust the threshold value for deploying the airbag 132. The airbag driving unit 152 deploys the airbag 132 when a magnitude of a control signal for deployment of the airbag 132 exceeds a threshold value.

In a vehicle according to an embodiment of the present disclosure, the threshold value for deploying the airbag 132 is variably adjusted according to the current state of the vehicle and the deployment of the airbag 132 may be efficiently determined. In other words, when the deployment of the airbag 132 is needed, the possibility of the airbag 132 being deployed is increased (a threshold value is adjusted to be lowered) so that the airbag 132 may be deployed efficiently.

In the controller 102, the driver intent determination logic 112 is provided to determine a possibility of collision of the vehicle before an actual collision of the vehicle occurs. To this end, while the driver is driving the vehicle, the driver intent determination logic 112 determines a collision avoidance intent of the driver from a driving manipulation pattern that is applied to the vehicle to avoid a vehicle collision when the vehicle is expected to collide with a nearby obstacle (another vehicle or structure).

The driver intent determination logic 112 receives detection signals from an accelerator pedal sensor 122, a brake pedal sensor 124, a steering angle sensor 126, and a navigation system 128 to determine the collision avoidance intent of the driver. The accelerator pedal sensor 122 detects the amount of manipulation of an accelerator pedal by the driver and transmits a detection signal to the driver intent determination logic 112 of the controller 102. The brake pedal sensor 124 detects the amount of manipulation of a brake pedal by the driver and transmits a detection signal to the driver intent determination logic 112 of the controller 102. The steering angle sensor 126 detects the amount of manipulation of a steering wheel by the driver and transmits a detection signal to the driver intent determination logic 112 of the controller 102. The navigation system 128 transmits information related to the current position of the vehicle on a map to the driver intent determination logic 112 of the controller 102.

When the vehicle is expected to collide with an obstacle while the driver is driving the vehicle, the driver releases his/her foot from the accelerator pedal and manipulates the brake pedal to generate a braking force to avoid the collision. In addition, the driver may change the direction of the vehicle by manipulating the steering wheel.

In addition, the revolution per minute (rpm) of the engine may be rapidly lowered as the driver releases his/her foot from the accelerator pedal and manipulates the brake pedal to generate a braking force to avoid a collision. In addition, an anti-lock brake system (ABS) may also be operated due to a sudden operation of the brake pedal by the driver.

In most cases, such a driving manipulation of the vehicle according to a collision avoidance intent of the driver starts before the vehicle collides with an obstacle. The controller 102 of the vehicle according to the embodiment of the present disclosure predicts a possibility of collision in advance through the driver intent determination logic 112 before an actual collision occurs, and actively and variably adjusts the threshold value for deploying the airbag 132 on the basis of a result of the prediction of the possibility of collision.

In the controller 102, the collision prediction determination logic 114 is provided to determine the possibility of collision of the vehicle in advance before an actual collision of the vehicle occurs. To this end, the collision prediction determination logic 114 determines whether a vehicle collision occurs from a signal provided from a nearby sensor 142.

The collision prediction determination logic 114 uses a detection signal of the nearby sensor 142 to determine whether a collision of the vehicle occurs. The nearby sensor 142 is a term collectively referring to an active sensor and a camera. In this embodiment, the active sensor refers to a laser sensor, a radar, an infrared sensor, or the like.

The collision prediction determination logic 114 detects a surrounding of the vehicle through the nearby sensor 142 and determines the possibility of collision between the vehicle and a nearby obstacle on the basis of a result of the detection. Since the collision prediction determination logic 114 detects the distance, the relative speed, and the direction of the vehicle with respect to the object, the collision prediction determination logic 114 may determine not only the possibility of collision between the vehicle and the obstacle but also the time and distance to collision with the obstacle through the result of the detection of the nearby sensor 142.

The controller 102 of the vehicle according to the embodiment of the present disclosure determines the possibility of collision of the vehicle on the basis of results of the determinations of the driver intent determination logic 112 and the collision prediction determination logic 114. The controller 102 actively and variably adjusts the threshold value for deploying the airbag on the basis of a result of the determination of the possibility of collision.

FIGS. 2-7 are views showing examples of a driving manipulation of a vehicle according to a collision avoidance intent of a driver. The driver intent determination logic 112 predicts a possibility of collision of the vehicle on the basis of the driver's vehicle driving manipulation patterns as shown in FIGS. 2-7.

Figure 2:
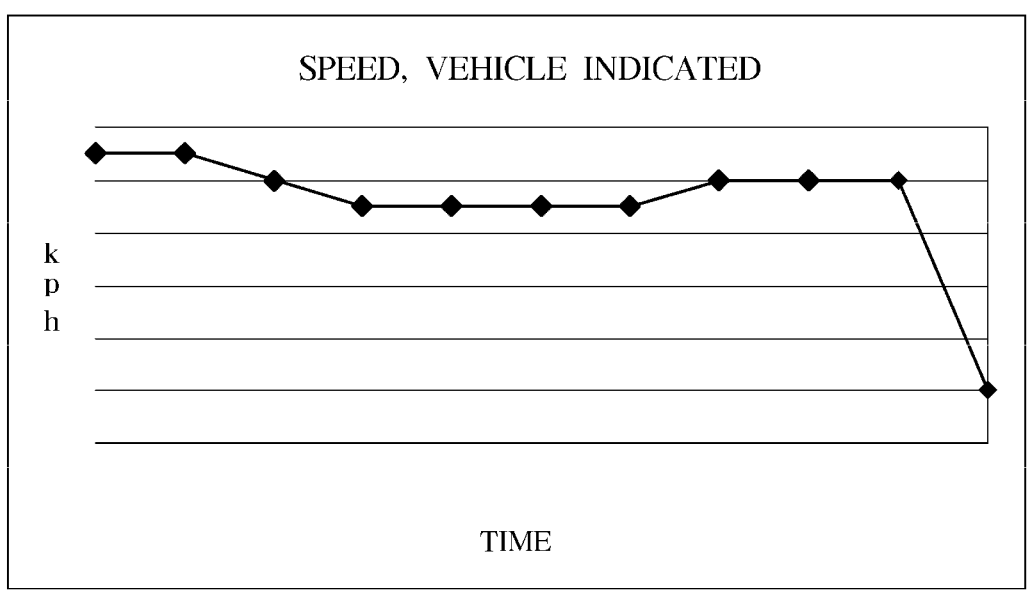
FIG. 2 is a view showing a change in the speed of the vehicle according to a collision avoidance intent of a driver.

FIG. 2 is a view showing a change in the speed of the vehicle according to a collision avoidance intent of a driver. When the vehicle is expected to collide with a nearby obstacle (another vehicle or structure) while the driver is driving the vehicle, the driver may release his/her foot from the accelerator pedal and manipulate the brake pedal to avoid a vehicle collision. At this time, the speed of the vehicle rapidly decreases immediately before a time point of 0 seconds as shown in FIG. 2. The time point of 0 seconds shown in FIG. 2 may be an expected point of time of collision time point or an actual point of time of collision. The driver intent determination logic 112 may determine the collision avoidance intent of the driver from such a rapid speed reduction of the vehicle.

Figure 3:
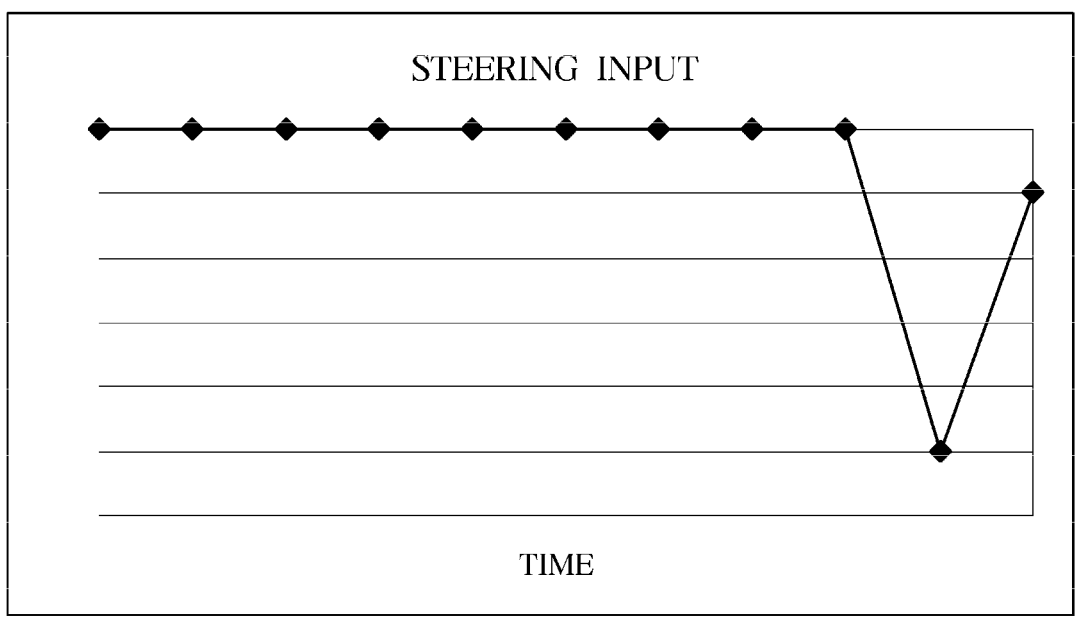
FIG. 3 is a view showing a change in the steering angle of the vehicle according to a collision avoidance intent of a driver.

FIG. 3 is a view showing a change in the steering angle of the vehicle according to a collision avoidance intent of a driver. When the vehicle is expected to collide with a nearby obstacle (such as another vehicle or structure) while the driver is driving the vehicle, the driver may attempt to change the direction of the vehicle by suddenly turning the steering wheel to avoid collision of the vehicle. At this time, the steering angle of the steering wheel detected through the steering angle sensor 126 rapidly changes to the right (or left) immediately before a collision and then changes to the left (or right) again as shown in FIG. 3. A steering angle of 0 degrees represents that the steering wheel is in a centered position (straight), and a steering angle of minus (−) represents that the driver manipulates the steering wheel to the right. The time point of 0 seconds shown in FIG. 3 may be an expected point of time of collision or an actual point of time of collision. The driver intent determination logic 112 may determine the collision avoidance intent of the driver from the sudden manipulation of the steering wheel.

Figure 4:
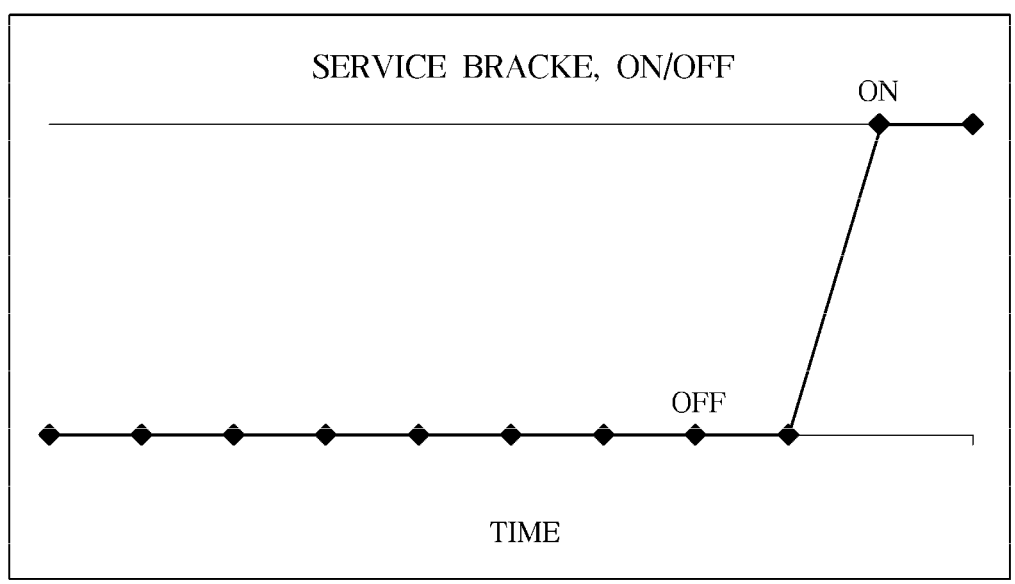
FIG. 4 is a view showing a change in the stepping force of a brake pedal of the vehicle according to a collision avoidance intent of a driver.

FIG. 4 is a view showing a change in the stepping force of a brake pedal of the vehicle according to a collision avoidance intent of a driver. When the vehicle is expected to collide with a nearby obstacle (such as another vehicle or structure) while the driver is driving the vehicle, the driver may release his/her foot from the accelerator pedal and manipulate the brake pedal to avoid a vehicle collision. At this time, the driver suddenly manipulates the brake pedal for rapid deceleration and stoppage, and the driver's stepping force on the brake pedal rapidly increases immediately before a time point of 0 seconds as shown in FIG. 4. The time point of 0 seconds shown in FIG. 4 may be an expected point of time of collision or an actual point of time of collision. The driver intent determination logic 112 may determine the collision avoidance intent of the driver from the sudden increase in the stepping force of the brake pedal.

Figure 5:
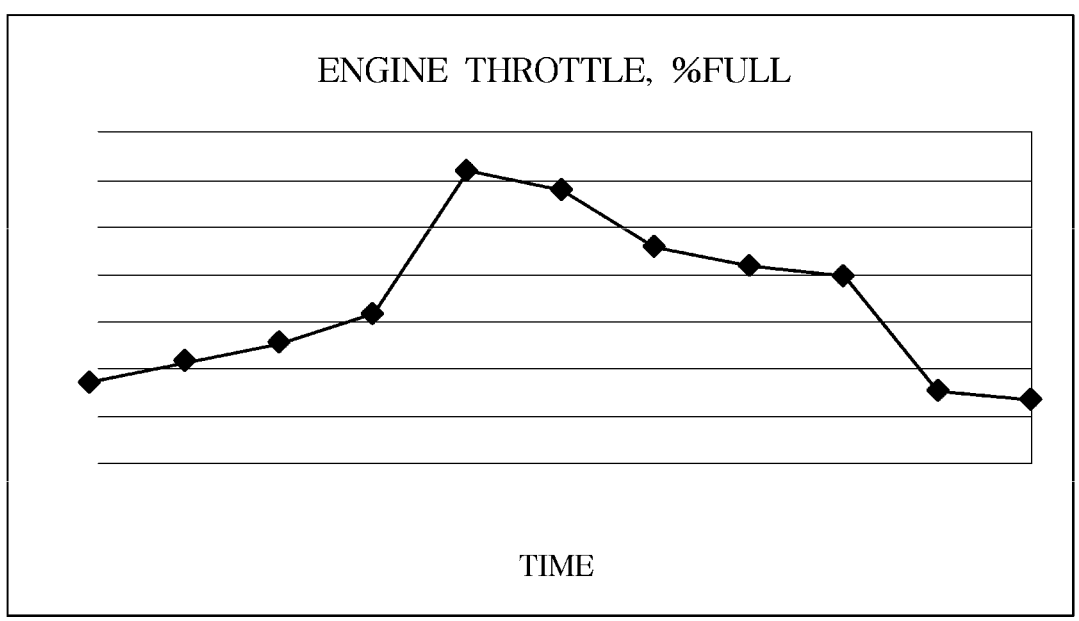
FIG. 5 is a view showing a change in the opening degree of a throttle valve of an engine of the vehicle according to a collision avoidance intent of a driver.

FIG. 5 is a view showing a change in the opening degree of a throttle valve of an engine of the vehicle according to a collision avoidance intent of a driver. When the vehicle is expected to collide with a nearby obstacle (such as another vehicle or structure) while the driver is driving the vehicle, the driver may release his/her foot from the accelerator pedal to avoid collision of the vehicle. As a result, a throttle valve of an engine is suddenly closed immediately before a time point of 0 seconds as shown in FIG. 5. The time point of 0 seconds shown in FIG. 5 may be an expected point of time of collision or an actual point of time of collision. The driver intent determination logic 112 may determine the collision avoidance intent of the driver from the sudden closing of the throttle valve of the engine.

Figure 6:
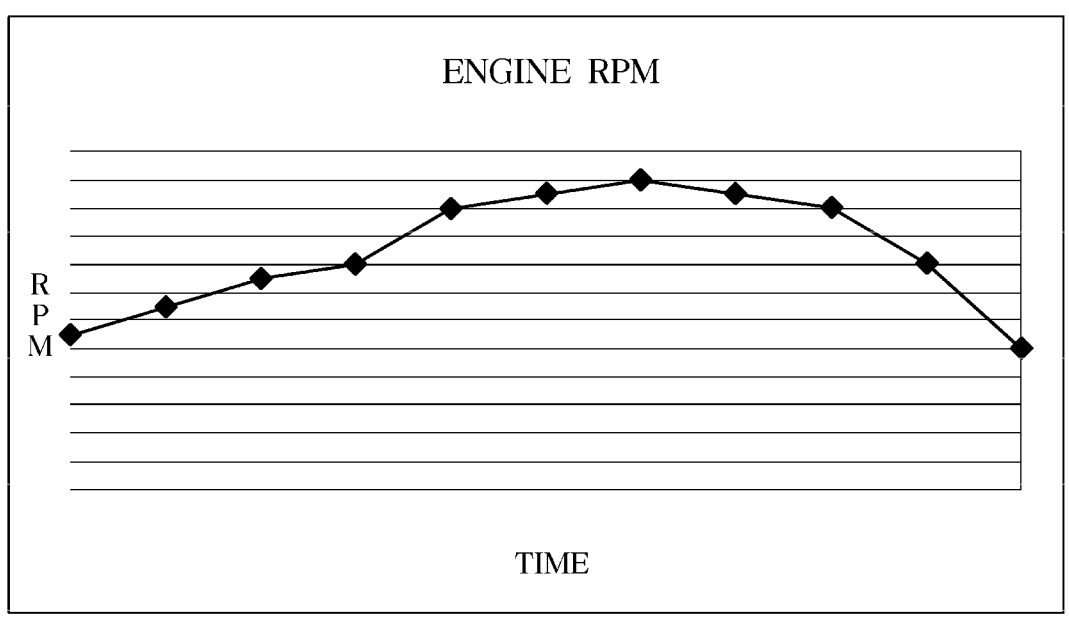
FIG. 6 is a view showing a change in the rotational speed of an engine of the vehicle according to a collision avoidance intent of a driver.

FIG. 6 is a view showing a change in the rotational speed of an engine of the vehicle according to a collision avoidance intent of a driver. When the vehicle is expected to collide with a nearby obstacle (such as another vehicle or structure) while the driver is driving the vehicle, the driver may release his/her foot from the accelerator pedal and manipulate the brake pedal to avoid a vehicle collision. As a result, the revolutions per minute (RPM) of the engine suddenly decreases immediately before a time point of 0 seconds as shown in FIG. 6. The time point of 0 seconds shown in FIG. 6 may be an expected point of time of collision or an actual point of time of collision. The driver intent determination logic 112 may determine the collision avoidance intent of the driver from the sudden decrease in the RPM of the engine.

Figure 7:
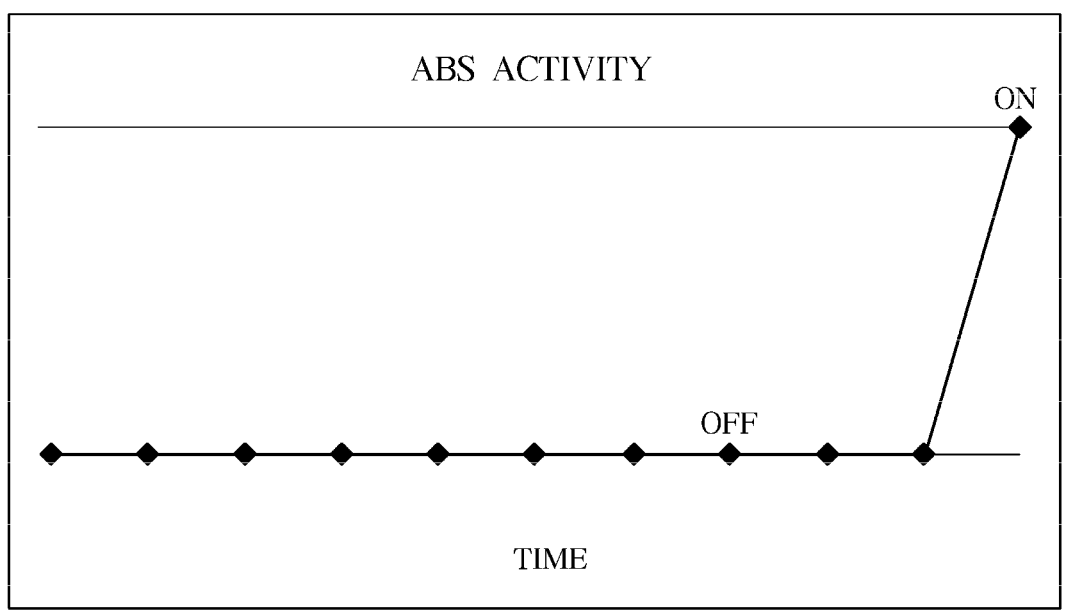
FIG. 7 is a view showing an operating state of an anti-lock brake system (ABS) of the vehicle according to a collision avoidance intent of a driver.

FIG. 7 is a view showing an operating state of an anti-lock brake system (ABS) of the vehicle according to a collision avoidance intent of a driver. When the vehicle is expected to collide with a nearby obstacle (such as another vehicle or structure) while the driver is driving the vehicle, the driver may release his/her foot from the accelerator pedal and suddenly manipulate the brake pedal to avoid a collision of the vehicle. Due to such a sudden manipulation of the brake pedal, the ABS of the vehicle is activated immediately before a time point of 0 seconds as shown in FIG. 7. The time point of 0 seconds shown in FIG. 7 may be an expected point of time of collision or an actual point of time of collision. The driver intent determination logic 112 may determine the collision avoidance intent from the activation of the ABS.

The driving manipulation patterns of the driver that may occur when the vehicle is expected to have a collision are not limited to those patterns shown in FIGS. 2-7. The driving manipulation patterns of the driver may further include various other driving manipulation patterns. Further, in order to determine the collision avoidance pattern of the driver, all of the driving manipulation patterns shown in FIGS. 2-7 may be used for the determination, or only some of the driving manipulation patterns may be selectively used if necessary.

Figure 8:
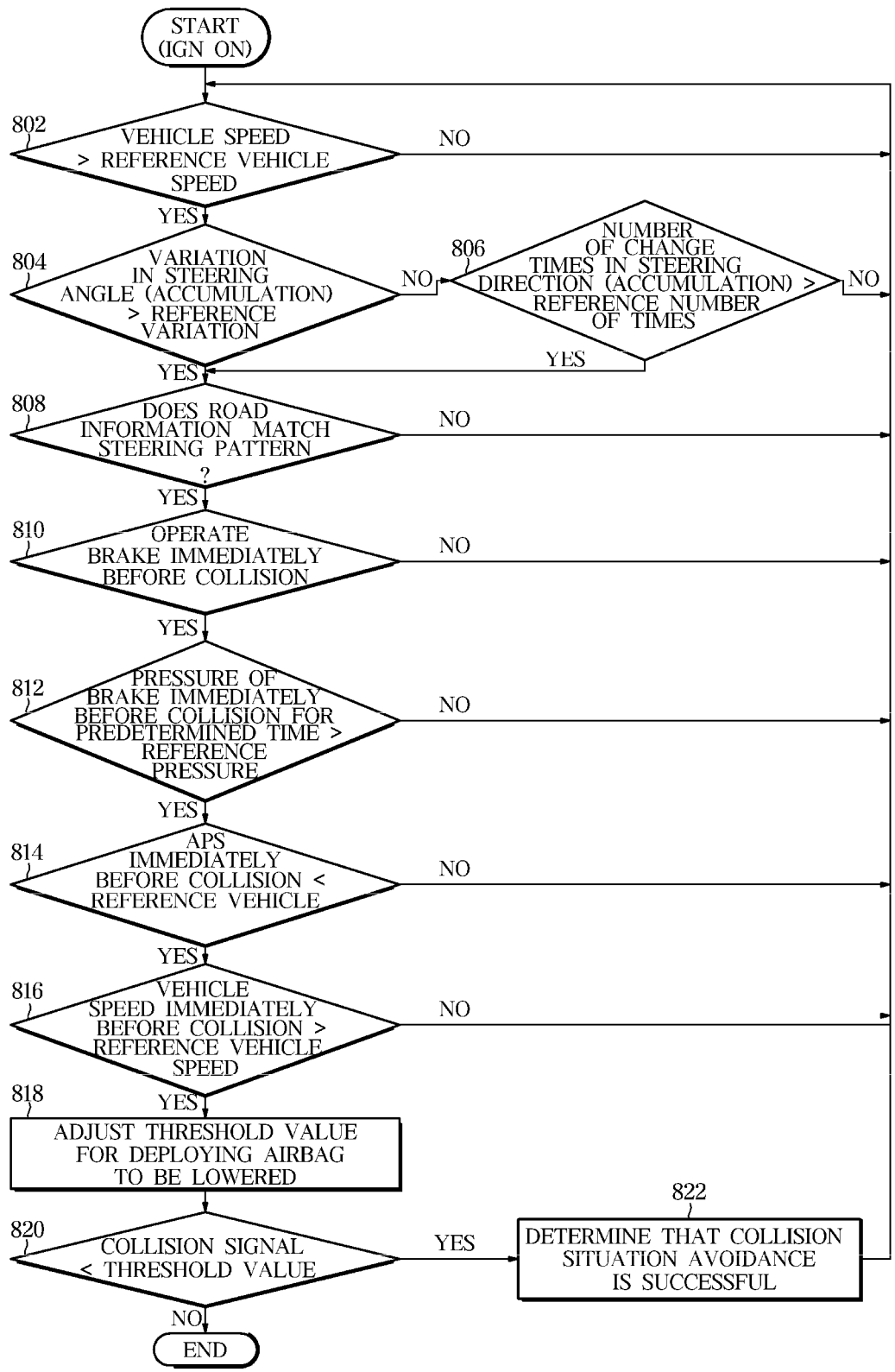
FIG. 8 is a flowchart showing a method of controlling an airbag of a vehicle according to an embodiment of the present disclosure.

FIG. 8 is a flowchart showing a method of controlling an airbag of a vehicle according to an embodiment of the present disclosure. In the control method shown in FIG. 8, the controller 102 determines the possibility of collision of the vehicle on the basis of various driving manipulation patterns of the driver as described above with reference to FIGS. 2-7. The controller 102 actively and variably adjusts the threshold value for deploying the airbag on the basis of a result of determination of the possibility of collision.

First, the controller 102 determines whether the vehicle speed of the vehicle exceeds a reference vehicle speed (802). Since deployment of the airbag 132 is not required at a relatively slow vehicle speed, it is determined whether the vehicle speed of the vehicle exceeds the reference vehicle speed so that the airbag 132 is deployed only at the reference vehicle speed or greater. The reference vehicle speed is a speed at which deployment of the airbag is desired for protecting the occupant.

Further, the controller 102 determines whether the variation in the steering angle of the steering wheel exceeds a reference variation (804). In this step, the variation in the steering angle may represent the amount of variations in the steering angle accumulated for a predetermined time period immediately before the collision. The cumulative amount of variations in the steering angle of the steering wheel is not great in a normal driving situation other than a collision situation. However, when the driver suddenly manipulates the steering wheel to avoid a collision in a situation where a collision is expected, the cumulative amount of variations of the steering angle of the steering wheel greatly increases. Accordingly, the controller 102 may determine the possibility of collision of the vehicle through the cumulative amount of variations of the steering angle of the steering wheel.

In addition, the controller 102 determines whether the number of change times in steering direction of the steering wheel exceeds a reference number of times (806). In this embodiment, the number of change times in steering direction of the steering wheel may represent the number of change times in steering direction of the steering wheel accumulated for a predetermined time immediately before the collision. As described above with reference to FIG. 3, when the vehicle is expected to collide with a nearby obstacle (such as another vehicle or a structure) while the driver is driving the vehicle, the driver may attempt to change the direction of the vehicle by suddenly turning the steering wheel to avoid collision of the vehicle. In addition, referring again to FIG. 3, since the sudden manipulation of the steering wheel repeatedly occurs in the opposite directions, such as the right and left (or left and right), the controller 102 may determine the possibility of collision of the vehicle when the number of change times in steering direction of the steering wheel suddenly increases to the reference number or above for a short period of time immediately before a collision In addition, the controller 102 checks whether information (shape) about a road being travelled by the vehicle matches a steering pattern of the steering wheel (808). When the vehicle normally travels along a road on the map of the navigation system 128, the driver may predict the possibility of collision of the vehicle and rapidly manipulate the steering wheel and thus the vehicle may depart from the road on the map. In this case, the shape of the road on the map and the steering direction of the steering wheel may not match each other. The controller 102 may confirm the collision avoidance intent of the driver from the mismatch between the shape of the road on the map of the navigation 128 and the steering direction of the steering wheel and predict the possibility of collision of the vehicle.

In addition, the controller 102 checks whether the driver suddenly manipulates the brake of the vehicle (810). When the vehicle is expected to collide with a nearby obstacle (such as another vehicle or structure) while the driver is driving the vehicle, the driver may release his/her foot from the accelerator pedal and manipulate the brake pedal to avoid a vehicle collision. The controller 102 may determine the collision avoidance intent of the driver from the sudden manipulation of the brake pedal.

In addition, the controller 102 checks whether the pressure of the brake of the vehicle exceeds a reference pressure for a predetermined time (812). Only with the manipulation of the brake in operation 810, the collision avoidance intent of the driver is not accurately determined, and thus the collision avoidance intent may be more accurately determined using a change in the pressure of the brake (the pressure of the piston) generated as the driver suddenly manipulates the brake pedal for rapid deceleration or stop.

In addition, the controller 102 checks whether the position of the accelerator pedal of the vehicle is less than a predetermined reference value (%) (814). The position of the accelerator pedal is determined as a ratio, from a non-operation state (0%) to a maximum acceleration state (100%), on the basis of the current position of the accelerator pedal. To this end, the accelerator pedal sensor 122 may be used. When the vehicle is expected to collide with an obstacle while the driver is driving the vehicle, the driver releases his/her foot from the accelerator pedal and manipulates the brake pedal to generate a braking force to avoid the collision. In this case, the position of the accelerator pedal suddenly decreases to a predetermined reference value or below, and the controller 102 may confirm the collision avoidance intent of the driver from the sudden change in the position of the accelerator pedal.

The controller 102 determines again whether the vehicle speed of the vehicle exceeds the reference vehicle speed (816). In operation 802, it is checked through comparison of the vehicle speed, whether the current vehicle speed of the vehicle is a vehicle speed for deployment of the airbag. In operation 816, the vehicle speed of the vehicle is compared once more to check again whether the vehicle speed of the vehicle is a vehicle speed for deployment of the airbag.

As such, the collision avoidance intent of the driver is checked through some or all operations of operation 802 to 816 as described in the above. When it is determined that the possibility of collision of the vehicle is present from the collision avoidance intent of the driver, the controller 102 adjusts the threshold value for deploying the airbag 132 to be lowered and transmits the adjusted threshold value to the airbag driving unit 152 (818). The presence of the possibility of collision of the vehicle refers to a situation in which the deployment of the airbag 132 is desired. Accordingly, by lowering the threshold value for deploying the airbag 132, the possibility of the airbag 132 being deployed is increased, so that the safety of the occupant is improved.

When a collision signal of the collision prediction determination logic 114 according to a prediction of collision resulting from a signal detected through the nearby sensor 142 is below a predetermined threshold value (YES in operation 820), the controller 102 determines that the vehicle has avoided a collision situation (822).

Referring to FIG. 8, the controller 102 checks the collision avoidance intent of the driver on the basis of various driving manipulation patterns of the driver, and determines the possibility of collision of the vehicle so that when deployment of the airbag 132 is desired, the possibility of the airbag being deployed is increased (the threshold value is adjusted to be lowered) so that the airbag 132 is effectively deployed.

The various driving manipulation patterns of the driver for determining the possibility of collision of the vehicle are not limited to those described in FIG. 8 and may further include various other driving manipulation patterns. Further, in order to determine the possibility of collision of the vehicle, all the conditions shown in FIG. 8 may be used, or only some of the conditions may be selectively used as necessary.

As is apparent from the above, the vehicle and the method of controlling the airbag of the vehicle can enhance the efficiency in airbag deployment by predicting a possibility of collision of the vehicle in advance from a driving manipulation pattern of a driver, and actively and variably adjusting a threshold value for deploying an airbag on the basis of a result of the prediction of the possibility of collision.

The above description of the present disclosure is for illustrative purposes, and a person having ordinary skill in the art should appreciate that other specific modifications may be easily made without departing from the technical spirit or essential features of the present disclosure. Therefore, the above embodiments should be regarded as illustrative rather than limitative in all aspects. The scope of the disclosure is not to be limited by the detailed description set forth above, but by the accompanying claims of the present disclosure. It should also be understood that all changes or modifications derived from the definitions and scope of the claims and their equivalents fall within the scope of the present disclosure.

What is claimed is:
1. A method of controlling an airbag of a vehicle, the method comprising:
 determining a possibility of collision of the vehicle from a driving manipulation pattern of a driver of the vehicle and a detected value of at least one sensor of the vehicle; and
 variably adjusting a threshold value for deployment of the airbag on the basis of a result of the determination of the possibility of collision,
 wherein the driving manipulation pattern for performing steering includes a mismatch of a manipulation direction of the steering wheel and a direction of a route displayed on a map of a navigation system in the vehicle.

2. The method of claim 1,
 wherein a collision avoidance intent of the driver is determined from the pattern of the driver manipulating the vehicle; and
 wherein the possibility of collision of the vehicle is determined from a result of the determination of the collision avoidance intent.

3. The method of claim 2, wherein the driving manipulation pattern of the vehicle includes a driving manipulation pattern for performing at least one of decelerating, braking, or steering of the vehicle.

4. The method of claim 3, wherein the driving manipulation pattern for performing braking includes at least one of: a speed of the vehicle being reduced by manipulation of a brake pedal; a pressure of a brake of the vehicle being increased by manipulation of the brake pedal; or an anti-lock brake system (ABS) of the vehicle being activated by manipulation of the brake pedal.

5. The method of claim 3, wherein the driving manipulation pattern for performing decelerating includes at least one of a revolution per minute (rpm) of an engine of the vehicle being reduced by manipulation of an accelerator pedal or an opening degree of a throttle valve of the engine of the vehicle being reduced by manipulation of the accelerator pedal.

6. The method of claim 1, wherein when a possibility of collision of the vehicle is determined to be present, the threshold value for deployment of the airbag is adjusted to be lowered such that a possibility of deployment of the airbag is increased.

7. The method of claim 6, wherein the adjusting of the threshold value for deployment of the airbag includes a plurality of different threshold values.

8. A vehicle comprising:
 an airbag;
 an airbag driving unit configured to deploy the airbag; and
 a controller configured to determine a possibility of collision of the vehicle from a driving manipulation pattern of a driver of the vehicle and a detected value of at least one sensor of the vehicle, and to variably adjust a threshold value for deployment of the airbag on the basis of a result of the determination of the possibility of collision,
 wherein the driving manipulation pattern of the vehicle includes manipulating a steering wheel of the vehicle, and
 wherein the driving manipulation pattern for performing steering includes a mismatch of a manipulation direction of the steering wheel and a direction of a route displayed on a map of a navigation system in the vehicle.

9. The vehicle of claim 8,
 wherein the controller is configured to:
 determine a collision avoidance intent of the driver from the pattern of the driver manipulating the vehicle; and
 determine the possibility of collision of the vehicle from a result of the determination of the collision avoidance intent.

10. The vehicle of claim 8, wherein the driving manipulation pattern of the vehicle includes a driving manipulation pattern for performing at least one of decelerating, braking, or steering of the vehicle.

11. The vehicle of claim 10, wherein the driving manipulation pattern for performing braking includes at least one of: a speed of the vehicle being reduced by manipulation of a brake pedal; a pressure of a brake of the vehicle being increased by manipulation of the brake pedal; or an anti-lock brake system (ABS) of the vehicle being activated by manipulation of the brake pedal.

12. The vehicle of claim 10, wherein the driving manipulation pattern for performing decelerating includes at least one of a revolution per minute (rpm) of an engine of the vehicle being reduced by manipulation of an accelerator pedal or an opening degree of a throttle valve of the engine of the vehicle being reduced by manipulation of the accelerator pedal.

13. The vehicle of claim 8, wherein the adjusting of the threshold value for deployment of the airbag includes a plurality of different threshold values.

14. A method of controlling an airbag of a vehicle, the method comprising:
    determining a collision avoidance intent of a driver of the vehicle from a driving manipulation pattern of the driver of the vehicle;
    detecting a value of at least one sensor of the vehicle;
    determining a possibility of collision of the vehicle from a result of the determination of the collision avoidance intent of the driver and the value of the at least one sensor of the vehicle; and
    variably adjusting a threshold value for deployment of the airbag on the basis of a result of the determination of the possibility of collision, wherein in response to a possibility of collision determined to be present, the threshold value for deployment of the airbag is adjusted to be lowered such that a possibility of deployment of the airbag is increased,
    wherein the driving manipulation pattern of the vehicle includes manipulating a steering wheel of the vehicle, and
    wherein the driving manipulation pattern for performing steering includes a mismatch of a manipulation direction of the steering wheel and a direction of a route displayed on a map of a navigation system in the vehicle.

15. The method of claim 14, wherein the driving manipulation pattern of the vehicle includes a driving manipulation pattern for performing at least one of decelerating, braking, or steering of the vehicle.

16. A vehicle comprising:
    an airbag;
    an airbag driving unit configured to deploy the airbag; and
    a controller configured to determine a collision avoidance intent of a driver of the vehicle from a driving manipulation pattern of the driver of the vehicle, to detect a value of at least one sensor of the vehicle, to determine a possibility of collision of the vehicle from a result of the determination of the collision avoidance intent of the driver and the value of the at least one sensor of the vehicle, and to variably adjust a threshold value for deployment of the airbag on the basis of a result of the determination of the possibility of collision, wherein in response to a possibility of collision determined to be present, the threshold value for deployment of the airbag is adjusted to be lowered such that a possibility of deployment of the airbag is increased,
    wherein the driving manipulation pattern of the vehicle includes manipulating a steering wheel of the vehicle, and
    wherein the driving manipulation pattern for performing steering includes a mismatch of a manipulation direction of the steering wheel and a direction of a route displayed on a map of a navigation system in the vehicle.

17. The vehicle of claim 16, wherein the driving manipulation pattern of the vehicle includes a driving manipulation pattern for performing at least one of decelerating, braking, or steering of the vehicle.

\* \* \* \* \*